United States Patent [19]
Ali et al.

[11] Patent Number: 4,726,010
[45] Date of Patent: Feb. 16, 1988

[54] OPTICAL COMMUNICATION SYSTEM IN THE SUBSCRIBER LOOP

[75] Inventors: Amar Ali, Stuttgart; Horst Ohnsorge, Freiberg, both of Fed. Rep. of Germany

[73] Assignee: Standard Elektrik Lorenz AG, Stuttgart, Fed. Rep. of Germany

[21] Appl. No.: 833,641

[22] Filed: Feb. 25, 1986

[30] Foreign Application Priority Data

Feb. 28, 1985 [DE] Fed. Rep. of Germany ....... 3507064

[51] Int. Cl.$^4$ .............................................. H04B 9/00
[52] U.S. Cl. ........................................... 370/3; 370/4; 370/50; 455/612
[58] Field of Search .................. 455/612; 370/1, 3, 4, 370/11, 50, 76

[56] References Cited

U.S. PATENT DOCUMENTS

4,491,983  1/1985  Pinnow et al. ..................... 455/612

OTHER PUBLICATIONS

Wong et al.-"Design Considerations"-NTG Fachber (Germany) vol. 73, 1980, pp. 125-131.
Knick et al.-"User Capacity"-Conf: 1981 Intern. Conf. on Comm.-Denver. Colo. 14-18, Jun. 1981-pp. 5.6.1-5.6.6.
Chang-"Fiberguide Systems"-Proc. of the IEEE vol. 68 #10, Oct. 1980, pp. 1291-1299.
Dupieux et al-"Optical Fiber Technology"-Broadband Networks Electrical Communication-vol. 56 #4-1981, pp. 379-384.

Primary Examiner—Joseph A. Orsino
Attorney, Agent, or Firm—Spencer & Frank

[57] ABSTRACT

The invention relates to an optical communication system for transmitting subscriber-assigned information in both directions between a center (1) and a plurality of subscribers (3a to 3n), particularly to the subscriber loop of a broadband communication system. In a remote distribution facility which is of either distributed (FIG. 1) or lumped (FIG. 2) design, the optical waveguides (5a to 5n) of a group of subscribers living or working near each other are coupled to a common optical waveguide (4) (or to two common optical waveguides) connected to the center (1). Subscriber-assigned signals to be transmitted from the center to the subscribers are combined into an electric time-division-multiplex signal which is transmitted as an optical signal with a single wavelength ($\lambda_o$) to the vicinity of the subscribers and distributed to the latter. From the electric time-division-multiplex signal, each of the subscribers takes only the signal intended for him. The signals to be transmitted from the subscribers to the center are transmitted as optical signals with subscriber-assigned wavelengths ($\lambda_1$ to $\lambda_n$) through subscriber-assigned optical waveguides to the common optical waveguide (4), are coupled into the latter, and are transmitted as a wavelength-division-multiplex signal to the center.

5 Claims, 2 Drawing Figures

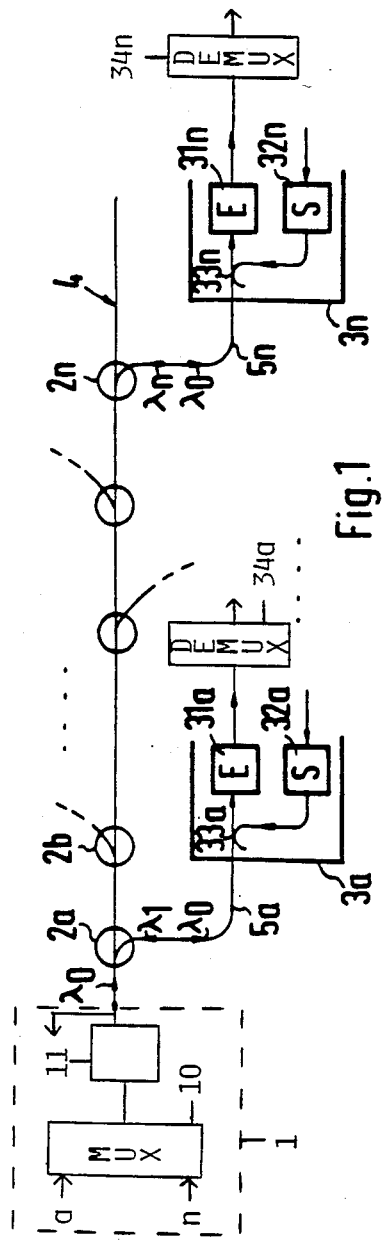
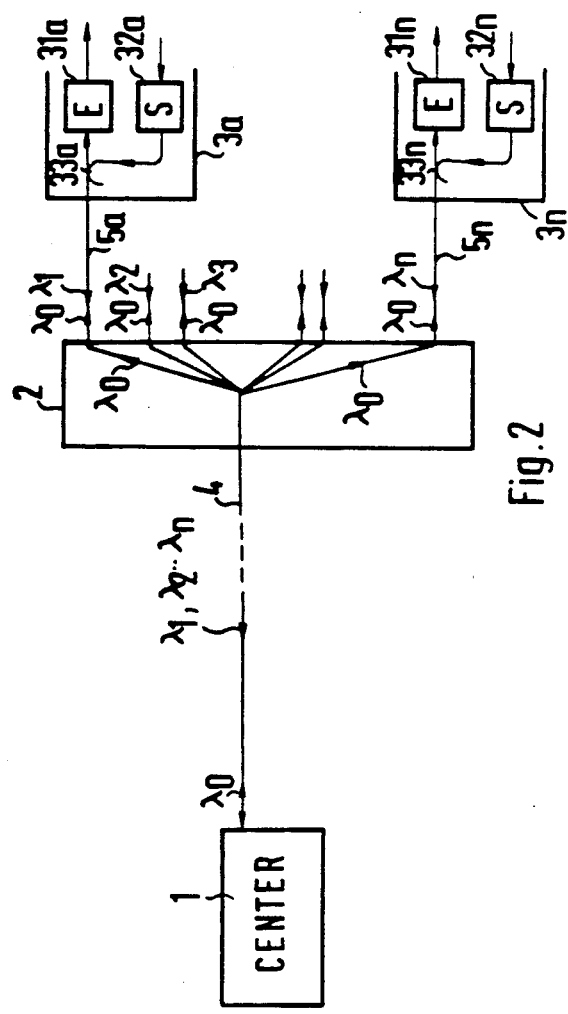

OPTICAL COMMUNICATION SYSTEM IN THE SUBSCRIBER LOOP

The present invention relates to an optical communication system for transmitting subscriber-assigned information signals in both directions between a center and a plurality of subscribers, the transmission of the subscriber-assigned information signals taking place either over a single optical waveguide for both directions or over separate optical waveguides, one for each direction.

A system of this kind is disclosed in "Elektrishes Nachrichtenwesen", Vol. 56, No. 4, 1981, pp. 379 to 384, especially FIG. 2. There, the subscribers are connected to the center in a star configuration, either by two optical waveguides per subscriber, one for each direction of transmission, as shown in FIG. 2a, or by a single optical waveguide through which the information is transmitted in both directions, as shown in FIG. 2b.

If the various subscriber terminals shown in FIG. 2b of the above reference are regarded as "subscribers" connected to the center, such a system does not constitute a system of the kind set forth in the first paragraph, because those "subscribers" can only receive or transmit, so there is no bidirectional transmission between the "subscribers" and the center.

U.S. patent application Ser. No. 495,318, filed May 16, 1983, now abandoned discloses an optical communication system wherein each subscriber of a group of subscribers is connected by an optical waveguide to a remote distribution unit which is common to this group and is connected to the center by a single optical waveguide.

In that system, however, no subscriber-assigned signals are transmitted, and there is no transmission in both directions. A composite signal (consisting of television signals) is transmitted from the center to the remote distribution unit, where it is distributed by optical means in such a manner that each of the subscribers connected to the remote distribution unit receives the same composite signal. There is no signal transmission in the reverse direction.

For bidirectional transmission of subscriber-assigned information signals between a center and a plurality of subscribers, the prior U.S. patent application Ser. No. 697,314, filed 2/1/85 now U.S. Pat. No. 4,686,667, proposes a system which uses one or two optical waveguides for each group of subscribers. The subscriber-assigned signals are combined at the center (exchange) into an electric time-division-multiplex signal which is transmitted as an optical signal over a single optical waveguide to an interface unit common to the group of subscribers, where they are converted back into the electric time-division multiplex signal. This signal is separated by electrical means into the subscriber-assigned signals, which are then transmitted over subscriber-assigned electric lines to the subscribers. In the reverse direction, i.e., from the subscribers to the center, the subscriber-assigned signals are transmitted correspondingly. This system is thus less expensive than the abovementioned star-structured system, but it is no optical system, because the subscribers are connected to the interface unit by electric lines.

Another system that is less expensive than the one mentioned at the beginning is disclosed in the prior U.S. patent application Ser. No. 744,354, filed June 13, 1985 now abandoned. This is an optical system, down to the connections to the subscribers. Subscriber-assigned optical waveguides are connected to remote distribution units each of which is common to a group of subscribers and is connected to the center by one or two optical waveguides. In both directions, the subscriber-assigned information signals are transmitted with subscriber-assigned wavelengths using wavelength-division multiplexing.

The invention will now be explained, by way of example, with reference to the accompanying drawings, in which:

FIG. 1 shows a first embodiment in which the signals are coupled into/from the common optical waveguide by means of a plurality of optical couplers each associated with one of the subscribers, and FIG. 2 shows a second embodiment in which the signals are coupled into/from the common optical waveguide by means of a single star coupler.

The system of FIG. 1 consists of a center 1 and a group of subscribers 3a to 3n, which are connected to the center 1 by optical-waveguide links described below.

In the following explanation of the embodiments, the direction of transmission from the center to the subscribers will be referred to as "downstream direction", and the direction of transmission from the subscribers to the center as "upstream direction".

For transmission in the downstream direction, the subscriber-assigned signals destined for a group of subscribers 3a to 3n are combined by an electrical multiplexer 10 at the center 1 into a time-division-multiplex signal having a bit rate of, e.g., 1.12 Gbit/s. An optical transmitter 11 with a wavelength $\lambda_0$ converts this TDM signal into an optical signal which is transmitted to the vicinity of the group of subscribers 3a to 3n over an optical waveguide 4 common to those subscribers. This optical waveguide 4 runs, for example, along a street at which the subscribers 3a to 3n are located.

Inserted in the optical waveguide 4 near each of the subscribers 3a to 3n is a passive optical coupler 2a to 2n which taps the downstream optical signal of wavelength $\lambda_0$ from the optical waveguide 4 common to the group and distributes it to subscriber-assigned optical waveguides 5a to 5n. In this manner, all subscribers 3a to 3n connected to the optical waveguide 4 via such a coupler are supplied with the same optical signal, i.e., in the downstream direction, a distribution of the optical signal to the subscribers takes place.

At each of the subscribers 3a to 3n, the optical signal is fed to an optical receiver 31a to 31n, which converts it back into the electric time-division-multiplex signal. This electric TDM signal is fed to a demultiplexer 34a to 34n which is designed so that the subscriber can withdraw from the TDM signal only the subscriber-assigned signal intended for him, while access to the subscriber-assigned signals intended for other subscribers is barred.

This can be accomplished in two different ways. The demultiplexers 34a to 34n at the subscribers 3a to 3n may be of uniform design and may separate the received TDM signal into the subscriber-assigned signals contained therein, so that the latter appear at the outputs of the demultiplexers. The subscriber terminal(s) is (are) connected only to that particular demultiplexer output at which the signal assigned to the subscriber appears; any connection to any of the other outputs is impossible.

Alternatively, the demultiplexers at the subscribers are subscriber-assigned demultiplexers which are designed to take only the signal intended for the respective subscriber from the multiplex signal and have no outputs at which other signals appear.

A subscriber-assigned signal of the kind described so far may be a time-division-multiplex signal composed of different signals, either for handling different telecommunication services for the same subscriber, i.e., for supplying different terminals of the same subscriber, or for supplying different members of a subscriber community living and/or working in a multiple dwelling, for example. In such cases, at least one additional electrical demultiplexer would be required to demultiplex the subscriber-assigned TDM signal.

In the former case, the optical receiver (e.g. 31a) and the following first demultiplexer would be installed in an interface unit, e.g., in the basement of a single-family house, whereas in the latter case, these devices would be installed, for example, in an interface unit which is located in the basement of a multiples dwelling and is common to a subscriber community. Terminologically, a "subscriber" in the sense introduced above would then be a subscriber community that uses a time-division-multiplex channel assigned to it on an individual basis.

In the upstream direction, the subscriber-assigned signals are transmitted as follows. At each of the subscribers 3a to 3n (who may also be a subscriber community) is an optical transmitter 32a to 32n with a subscriber-assigned wavelength $\lambda_1$ to $\lambda_n$, which converts the electric signal to be transmitted by this subscriber (or this subscriber community) into an optical single having the subscriber-assigned wavelength.

The electric signal applied to the transmitter may be a time-division-multiplex signal composed of signals from different terminals of a single subscriber or from different subscribers forming a subscriber community.

Preferably, the optical signal transmitted by a subscriber is coupled by means of a directional coupler 33a to 33n into that subscriber-assigned optical waveguide 5a to 5n through which the optical signal of wavelength $\lambda_0$ is transmitted from the common waveguide 4 to the subscribers.

Each upstream signal from a subscriber thus travels through the subscriber-assigned optical waveguide to the optical coupler associated with the subscriber, i.e., the coupler 2a to 2n, where it is coupled into the optical waveguide 4 common to the group of subscribers 3a to 3n. Through this optical waveguide 4, the signal is transmitted to the center 1.

In the upstream direction, the whole of the couplers 2a to 2n inserted into the optical waveguide 4 thus forms a wavelength-division-multiplex signal composed of the subscriber-assigned signals, which is transmitted to the center.

The couplers 2a to 2n are directional couplers, which prevent a signal to be transmitted in the upstream direction from being also transmitted in the downstream direction. The couplers are either fiber-optic couplers (FIG. 1) (e.g., couplers made using the fusing or polishing technique) or suitable direction-separating/-coupling optical filters or combinations thereof.

The center 1 contains a wavelength-division demultiplexer (not shown) which separates the received TDM signal into the subscriber-assigned optical signals contained therein and feeds them to the subscriber-assigned optical receivers.

The embodiment of FIG. 2 differs from the embodiment of FIG. 1 only in the way the subscriber-assigned signals are withdrawn from and coupled into the common waveguide 4. For this purpose, the embodiment of FIG. 2 uses a single lumped (i.e., concentrated) optical component, a star coupler, which distributes the downstream optical signal of wavelength $\lambda_0$ to the subscriber-assigned optical waveguides 5a to 5n and combines the upstream optical signals from the subscribers 3a to 3n, which have the subscriberassigned wavelengths $\lambda_1$ to $\lambda_n$, into a wavelength-divisionmultiplex signal. The star coupler 2 must be thought of as a lumped remote distribution unit located near the subscribers 3a to 3n, whereas the couplers 2a to 2n of FIG. 1 must be regarded as a distributed remote distribution facility. A star coupler can be constructed either by fusing together a plurality of optical waveguides in a single zone (FIG. 2) or by fusing together pairs of optical waveguides to obtain a binary tree structure.

The star coupler 2 ensures that upstream signals are not reflected in the downstream direction to another subscriber.

The advantages of the system in accordance with the invention are that only a signle optical transmitter is present at the center, that uniform receivers are present at the subscribers, and that the couplers 2a to 2n or the star coupler 2 are of simple construction. According to the geographical location of the group of subscribers to be connected to the center, either the distributed remote distribution facility of FIG. 1 or the lumped remote distributing unit of FIG. 2 will be more advantageous.

In the two embodiments of FIGS. 1 and 2, both the common optical waveguide 4 and each of the subscriber-assigned optical waveguides 5a to 5n are used for transmission in both directions. However, there are still other possibilities of implementing the principle in accordance with the invention.

The first possibility is to use two completely separate systems, one for each direction of transmission, i.e., a first common optical waveguide for transmission in the downstream direction into which couplers each associated wih one subscriber are inserted as shown in FIG. 1, the couplers coupling the optical signal of wavelength $\lambda_0$ from the common optical waveguide to subscriber-assigned optical waveguides each connected to the receiver of one subscriber. For the transmission of the signals with the subscriber-assigned wavelengths $\lambda_1$ to $\lambda_n$ in the upstream direction, separate optical waveguides are provided each of which is connected to the output of the optical transmitter of a subscriber and, through a coupler associated with the subscriber, to a second common optical waveguide for transmission in the upstream direction. The optical waveguides of FIG. 2 and the star coupler may also be duplicated for transmission in both directions.

The second possibility is to use a single common optical waveguide for bidirectional transmission to which, however, each of the subscribers is connected by two subscriber-assigned optical waveguides and via two associated couplers inserted in the common optical waveguide. One of the couplers serves to couple out, i.e., distribute, the downstream optical signal of wavelength $\lambda_0$ to the subscriber, and the other serves to couple in the subscriber-assigned signal with the subscriber-assigned light wavelength which is transmitted from the subscriber's optical transmitter through a subscriber-assigned optical waveguide to the common optical waveguide. It must be ensured that the signal transmitted by a subscriber's transmitter cannot reach the receiver of the same subscriber and the receivers of the other subscribers. The arrangement of FIG. 2 may also be designed so that bidirectional transmission between the center 1 and the star coupler 2 takes place over a single optical waveguide, but that the transmitter and receiver of a subscriber are connected to the star coupler by two separate subscriber optical waveguides, one for each direction of transmission. This can be done as follows. A first star coupler combines the optical signals transmitted by the subscribers' transmitters to the remote distribution unit into a wavelength-division-multiplex signal, and the remote distribution unit contains a directional coupler which couples this WDM signal into the common optical waveguide and couples the downstream optical signal from the common optical waveguide to a second star coupler which distributes it through subscriber-assigned optical waveguides to the subscribers' receivers.

A third possibility is to use two common optical waveguides for the two directions of transmission, and a single subscriber-assigned optical waveguide for transmission in both directions between a subscriber and a coupling point at the two common optical waveguides, with the subscriber-assigned optical waveguide connected through an optical directional coupler to a coupler which is inserted in the downstream optical waveguide and withdraws the downstream optical signal, and to a coupler inserted in the upstream optical waveguide for coupling the signal from the subscriber into this upstream optical waveguide. Correspondingly, in the embodiment using a lumped remote distribution unit as shown in FIG. 2, a subscriber-assigned optical waveguide used for both directions of transmission may be connected via a directional coupler to a first star coupler which combines the subscriber-assigned optical signals to be transmitted in the upstream direction into a wavelength-division-multiplex signal and couples this signal into the upstream optical waveguide, and to a second star coupler which distributes the optical signal transmitted through the downstream optical waveguide to the group of subscribers.

All these examples are based on the principle that the subscriber-assigned signals to be transmitted in the downstream direction are combined using time-division multiplexing, while the signals to be transmitted in the upstream direction are combined using wavelength-division multiplexing.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

We claim:

1. In an optical communication system including a center and a plurality of subscribers for transmitting subscriber-assigned information signals in both directions between the center and the subscribers, the system further incluidng optical transmission means for the transmission of the information signals, the improvement wherein:

said plurality of subscribers is arranged in at least one group of subscribers;

said center comprises multiplexing means for combining subscriber-assigned information signals intended for the subscribers of one said group into an electrical time-division-multiplex signal; and transducer means connected for converting the electrical signal into an optical signal having a single wavelength and for supplying the optical signal to said optical transmission means for transmission to the vicinity of the subscribers of said one group;

each subscriber of said one group comprises: means for reconverting the optical signal having a single wavelength into the electrical time-division-multiplex signal and for extracting from the electrical signal the subscriber-assigned information signal intended for that subscriber; and means for producing a second information signal and for converting the second information signal into an optical signal at a respective wavelength individually assigned to that subscriber; and said optical transmission means comprises at least one common optical waveguide associated with all subscribers of said one group and connected to said center, at least one group of individual waveguides each connected to a respective subscriber of said one group, and passive optical means connected between said at least one common waveguide and said at least one group of individual waveguides, for transmitting the optical signal having a single wavelength from said center to all subscribers of said one group and for transmitting the second information signals produced by all subscribers of said one group as a wavelength-division-multiplexed signal to said center.

2. A system as defined in claim 1 wherein said passive optical means comprise at least one plurality of passive optical couplers each connected to a respective subscriber of said one group and each connected to said at least one common optical waveguide at a location in the vicinity of the respective subscriber.

3. A system as defined in claim 1 wherein said passive optical means comprise at least one lumped passive star coupler connected between said at least one common waveguide and all subscribers of said one group.

4. A system as defined in claim 1 wherein said optical transmission means include a single common optical waveguide for transmitting both the optical signal having a single wavelength from said center and the wavelength-division multiplexed signal to said center, and a single group of individual waveguides, each individual waveguide being connected between a respective subscriber of said one group and said common optical waveguide for transmitting the optical signal having a single wavelength from said common optical waveguide to the respective subscriber and the second information signal from the respective subscriber to said common optical waveguide.

5. A system as defined in claim 4 wherein each subscriber of said one group comprises: an optical transmitter for transmitting said second information signal; an optical receiver for receiving the optical signal having a single wavelength; and an optical directional coupler coupling said optical transmitter and said optical receiver to said individual waveguides connected to said subscriber.

* * * * *